United States Patent
Jang et al.

(10) Patent No.: US 12,440,864 B2
(45) Date of Patent: Oct. 14, 2025

(54) SLOT DIE COATING DEVICE TO WHICH NEGATIVE PRESSURE GENERATION IS APPLIED AND METHOD OF USING THE SAME

(71) Applicants: Hyundai Motor Company, Seoul (KR); Kia Corporation, Seoul (KR)

(72) Inventors: Shin Jang, Chungcheongnam-do (KR); Jun Tae Kim, Gyeonggi-do (KR); Ji Young Kim, Gyeonggi-do (KR); Jin Seong Choi, Gyeonggi-do (KR); Hyo Jong Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 243 days.

(21) Appl. No.: 17/990,674

(22) Filed: Nov. 19, 2022

(65) Prior Publication Data
US 2023/0201862 A1    Jun. 29, 2023

(30) Foreign Application Priority Data
Dec. 27, 2021    (KR) .................. 10-2021-0188166

(51) Int. Cl.
| | | |
|---|---|---|
| *B05C 5/02* | (2006.01) | |
| *B05D 1/26* | (2006.01) | |
| *H10N 30/20* | (2023.01) | |
| *H10N 30/85* | (2023.01) | |

(52) U.S. Cl.
CPC ............ *B05C 5/0258* (2013.01); *B05D 1/26* (2013.01); *H10N 30/206* (2023.02); *H10N 30/85* (2023.02)

(58) Field of Classification Search
None
See application file for complete search history.

(56) References Cited

U.S. PATENT DOCUMENTS

| | | | | |
|---|---|---|---|---|
| 4,594,063 | A * | 6/1986 | Reifenhauser | B29C 48/313 425/141 |
| 4,938,994 | A * | 7/1990 | Choinski | B05C 5/0254 430/311 |
| 2009/0129952 | A1 * | 5/2009 | Patrascu | F04B 43/046 417/322 |
| 2015/0352589 | A1 * | 12/2015 | Brown | B05C 11/00 427/9 |
| 2019/0308370 | A1 * | 10/2019 | Lyckfeldt | B22F 12/53 |

FOREIGN PATENT DOCUMENTS

KR       10-2272516 B1    7/2021

* cited by examiner

*Primary Examiner* — Michael P. Rodriguez
(74) *Attorney, Agent, or Firm* — Fox Rothschild LLP (57) ABSTRACT

Provided is a slot die coating device, and more specifically, a slot die coating device in which negative pressure generation is applied into a slot die and a method of using the same. The slot die coating device includes a first main body including a first surface, a second main body including a second surface corresponding to the first surface, and located to be spaced apart from the first surface by a regular interval, a main body unit including a head lip that is a space between the first surface and the second surface, and a negative pressure generation unit installed on at least one of the first main body and the second main body.

17 Claims, 9 Drawing Sheets

SLOT DIE COATING DEVICE TO WHICH NEGATIVE PRESSURE GENERATION IS APPLIED AND METHOD OF USING THE SAME

CROSS-REFERENCE TO RELATED APPLICATION

This application claims under 35 U.S.C. § 119(a) the benefit of Korean Patent Application No. 10-2021-0188166 filed on Dec. 27, 2021, the entire contents of which are incorporated herein by reference.

BACKGROUND

Technical Field

The present disclosure relates to a slot die coating device, and more specifically, to a slot die coating device in which negative pressure generation is applied into a slot die and a method of using the same.

Background

Slot die coating devices are mainly used to coat surfaces of substrates such as fabrics, films, sheets, or panels.

Recently, the slot die coating devices are mainly used in manufacturing electrode materials for secondary batteries or solar cells. In addition, the slot die coating devices may continuously form a coating region on the surface of the substrate or form the coating regions of certain areas to be spaced apart from each other in a roll-to-roll method.

The slot die coating devices pump a coating agent from a tank in which the coating agent is stored to supply the coating agent to a slot die through which the coating agent is discharged.

A method of intermittently operating a pump configured to supply the coating agent to intermittently supply the coating solution to the slot die or blocking the supply of the coating agent for a certain time by closing a valve is applied to the slot die coating devices.

However, the conventional coating device provided with the slot die has a problem in that the droplet of the coating agent at the distal end of the slot is not cut off in time by physical properties (viscosity, surface tension, etc.) and dragged to the substrate or dropped by gravity in both the structure of intermittently operating the pump and the structure of closing the valve.

Accordingly, there occurs a problem in that a coating thickness on the surface of the substrate is not uniform, thereby affecting the quality of the final product.

In addition, since the time for the on/off valve to be closed and then opened depends on a system response speed of the coating device determined by specifications of the valve, there is a limit to reducing the time as much as desired. Accordingly, there are disadvantages in that problems occur such as not forming a straight line with a clean boundary on the surface of the substrate, and being dragged to the surface of the substrate while coating due to the viscosity and surface tension of the agent at the distal end of the slot die occur.

Accordingly, there is a need for the development of a slot die coating device capable of precisely controlling the supply of the coating agent under the above background.

The above information disclosed in this Background section is only for enhancement of understanding of the background of the disclosure and accordingly it may include information that does not form the prior art that is already known in this country to a person of ordinary skill in the art.

SUMMARY OF THE DISCLOSURE

The present disclosure is proposed to solve the above problems, and in one aspect an object of the present disclosure is to provide a slot die coating device to which negative pressure generation capable of precisely controlling the supply of a coating agent is applied, and a method of using the same.

In one aspect, a slot die coating device is provided that comprises a) a first main body comprising a first surface, b) a second main body comprising a second surface and located to be spaced apart from the first surface, and c) a head lip that is positioned between the first surface and the second surface; and d) a negative pressure generation unit installed on at least any one of the first main body and the second main body, and configured to generate a negative pressure in the head lip.

In one embodiment, the slot die coating device suitably further comprises (a) a cavity formed to be recessed at a location spaced apart from the negative pressure generation unit, and in communication with the head lip, and having a coating agent therein, wherein the coating agent can move to the discharge unit through one end of the head lip, and can be discharged to the outside through the discharge unit. In a further embodiment, the slot die coating device suitably further comprises a discharge unit formed between the first protrusion unit and the second protrusion unit, the discharge unit is in communication with the head lip. In a further embodiment, the first main body suitably further comprises a first protrusion unit formed to protrude by a certain length in a direction of the other end of the head lip. In a further embodiment, the second main body suitably further comprises a second protrusion unit formed to protrude by a certain length in the direction of the other end of the head lip.

In a further aspect, a slot die coating device according to the present disclosure includes: a main body unit including a first main body including a first surface, a second main body including a second surface corresponding to the first surface, and a head lip that is a space between the first surface and the second surface; and a negative pressure generation unit installed on at least any one of the first main body and the second main body, and configured to generate a negative pressure in the head lip.

The first surface and the second surface suitably are uniformly or regularly spaced apart. The main body unit suitably may include: a cavity formed to be recessed at a location spaced apart from the negative pressure generation unit by a certain distance, being in communication with the head lip, and having a coating agent stored therein, the first main body suitably may include: a first protrusion unit formed to protrude by a certain length in a direction of the other end of the head lip, the second main body may include: a second protrusion unit formed to protrude by a certain length in the direction of the other end of the head lip, a discharge unit may be formed between the first protrusion unit and the second protrusion unit, the discharge unit suitably may be in communication with the head lip, the coating agent stored in the cavity may move to the discharge unit through one end of the head lip, and may be discharged to the outside through the discharge unit.

The first protrusion unit suitably may be formed to protrude to be inclined in a first surface direction, and the second protrusion unit may be formed to protrude to be inclined in a second surface direction.

The slot die coating device may further include: a coating agent supply unit located outside the main body unit, and configured to supply the coating agent and a supply flow path installed within the second main body, having one end connected to the coating agent supply unit, and the other end connected to the cavity to receive the coating agent from the coating agent supply unit to transmit the coating agent to the cavity.

The negative pressure generation unit suitably may be located between the discharge unit and the cavity.

The negative pressure generation unit suitably may be embedded in at least any one of the first surface and the second surface.

The negative pressure generation unit may include: a piezoelectric element contracted or expanded when a voltage is applied, and the slot die coating device may further include: a power supply unit electrically connected to the piezoelectric element to supply a voltage to the piezoelectric element.

The piezoelectric element suitably may be contracted or expanded when the voltage is applied and reduced in thickness.

The piezoelectric element suitably may include: at least any one selected from the group consisting of Zinc oxide (ZnO), Barium Titanate (BaTiO$_3$), Lead zirconate titanate (PZT), Polyvinylidene fluoride (PVDF), Poly (vinylidene fluoride-trifluoroethylene (P(VDF-TrFE)), poly (vinylidene fluoride-trifluoroethylenechlorotrifluoroethylene)) (P(VDF-TrFE-CTFE)), poly(vinylidene fluoride-trifluoroethylenechlorofluoroethylene)(P(VDF-TrFE-CFE)), poly(vinylidene fluoride-co-hexafluoropropylene)(P(VDF-HFP)), and combinations thereof.

The negative pressure generation unit suitably may include: a movable material having a certain thickness, and having an outermost surface installed to form the same plane as the first surface or the second surface, and the slot die coating device may further include: a driving unit connected to the movable material to move the movable material in an inner direction of the first surface or the second surface and a power supply unit electrically connected to the driving unit to supply power.

The movable material suitably may include: at least any one selected from the group consisting of a metal, an inorganic material, an organic material, and combinations thereof.

The negative pressure generation device suitably may expand an inner area of the head lip through contraction or movement.

The negative pressure generation unit suitably may increase the volume of the head lip through contraction or movement to reduce the pressure of the head lip.

A plurality of negative pressure generation units suitably may be installed on the first main body or the second main body.

The negative pressure generation unit suitably may include: a piezoelectric element installed on the first main body and contracted when a voltage is applied and a movable material installed on the second main body and installed to be movable into the second surface by a driving unit.

In addition, a method of using the slot die coating device suitably includes: supplying a coating agent to the slot die coating device and generating a negative pressure in the head lip by the negative pressure generation unit.

The negative pressure generation unit suitably may include: the piezoelectric element contracted when the voltage is applied, the operation of generating the negative pressure may apply the voltage to the piezoelectric element, and the piezoelectric element to which the voltage is applied may be contracted to reduce the pressure of the head lip.

The negative pressure generation unit suitably may include: the movable material installed to be movable into the first surface or the second surface by the driving unit, and the operation of generating the negative pressure may move the movable material in the inner direction of the first surface or the second surface through the driving unit, and the movable material may move, thereby reducing the pressure of the head lip.

In one aspect, the operation of supplying the coating agent and the operation of generating the negative pressure suitably may be alternately performed.

The slot die coating device according to the present disclosure suitably can include the negative pressure generation unit configured to generate the negative pressure in the head lip by expanding the inner area of the head lip through contraction or movement, thereby minimizing the dragging to the surface of the substrate while coating, so that it is possible to neatly finish the boundary of the coating region.

In addition, the slot die coating device according to the present disclosure suitably can precisely control the discharge of the coating agent by directly controlling the pressure inside the main body unit.

The effects of the present disclosure are not limited to the above-described effects. It should be understood that the effects of the present disclosure include all effects that can be inferred from the following description.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, preferred embodiments of the present disclosure will be described in detail with reference to the accompanying drawings as follows. Before describing the present disclosure in detail, it should be noted that the terms or words used in this specification should not be interpreted as being unconditionally limited to their ordinary or dictionary meanings, and the inventors of the present disclosure may appropriately define and use the concepts of various terms in order to describe their invention in the best way, and furthermore, these terms or words should be interpreted as meanings and concepts consistent with the technical spirit of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Furthermore, it should be noted that when it is described that a component "exists therein or is connected to and installed on" another component, this component may be directly connected to or installed in contact with another component, and may also be installed to be spaced apart by a regular distance, and when this component is installed to be spaced apart from another component by the regular distance, a third component or means for fixing or connecting the corresponding component to another component may exist, and the description of the third component or means may also be omitted.

On the other hand, it should be understood that when it is described that a component is "directly connected" or "directly coupled" to another component, there is no third component or means.

Likewise, other expressions describing the relationship between the respective components, that is, "between" and "immediately between", or "adjacent to" and "directly adjacent to", should be interpreted as having the same meaning.

In addition, in this specification, it should be noted that when terms such as "one surface", "the other surface", "one side", "the other side", "first", and "second" are used, these terms are used for clearly distinguishing one component from another component with respect to one component, and the meaning of the corresponding component is not limitedly used by these terms.

In addition, in this specification, it should be noted that when terms related to positions such as "upper", "lower", "left", and "right" are used, these terms indicate the relative positions with respect to the corresponding component in the corresponding drawings, and these position-related terms should not be understood as referring to absolute positions unless the absolute positions are specified for these positions.

Furthermore, in the specification of the present disclosure, it should be noted that when terms such as "part", "unit", "module", and "device" are used, it means a unit capable of processing one or more functions or operations, which may be implemented by hardware or software, or a combination of hardware and software.

In addition, in this specification, in denoting the reference numerals for each component in each drawing, the same components have the same reference numbers even when the components are indicated in different drawings, that is, the same reference numerals indicate the same components throughout the specification.

In the drawings attached to this specification, the sizes, positions, coupling relationships, and the like of each component constituting the present disclosure may be partially exaggerated, reduced, or omitted in order to convey the spirit of the present disclosure sufficiently clearly or for convenience of explanation, and accordingly, the proportion or scale thereof may not be exact.

In addition, in the following description of the present disclosure, a detailed description of a configuration determined to unnecessarily obscure the gist of the present disclosure, for example, a detailed description of a known technology including the related art may also be omitted.

The present disclosure relates to a slot die coating device to which negative pressure generation is applied, and a method of using the same.

The slot die coating device according to the present disclosure includes a first main body including a first surface, a second main body including a second surface corresponding to the first surface, and located to be spaced apart from the first surface by a regular interval, a main body unit including a head lip that is a space between the first surface and the second surface, and a negative pressure generation unit installed on at least one of the first main body and the second main body to generate a negative pressure in the head lip.

The slot die coating device according to the present disclosure may be represented by a first embodiment and a second embodiment according to the configuration of the negative pressure generation unit.

Hereinafter, embodiments of the present disclosure will be described in more detail with reference to the accompanying drawings.

First Embodiment

Figure 1:
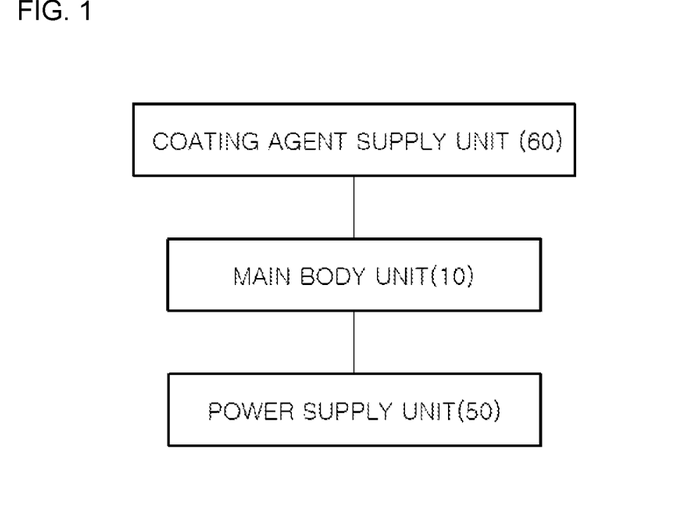
FIG. 1 is a schematic block diagram of a slot die coating device.
Figure 2A:
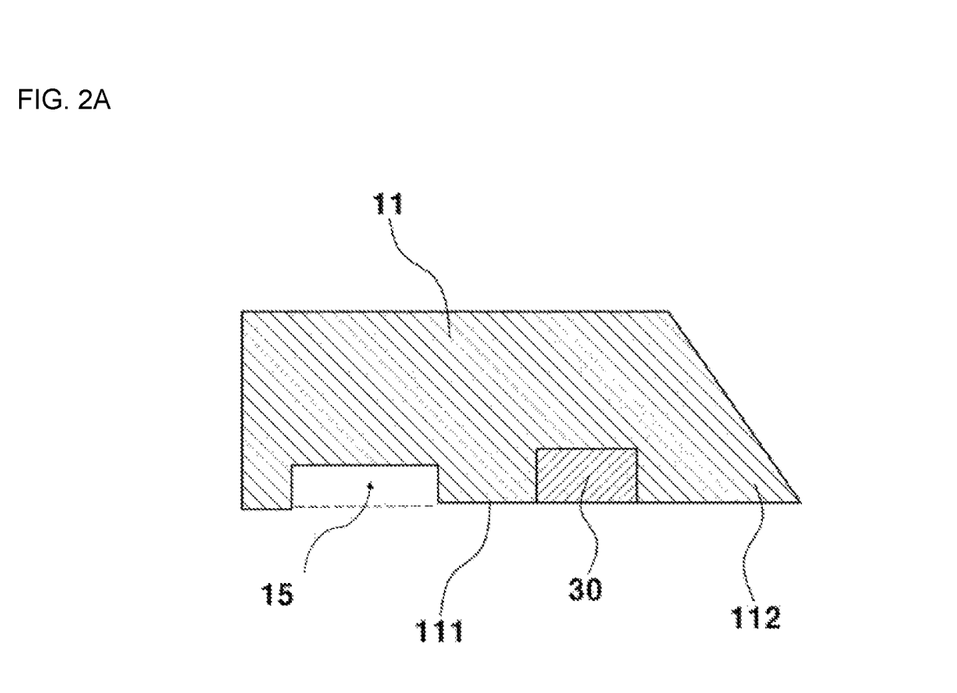
FIG. 2A is a diagram schematically showing a cross-sectional diagram of a first main body.
Figure 3A:
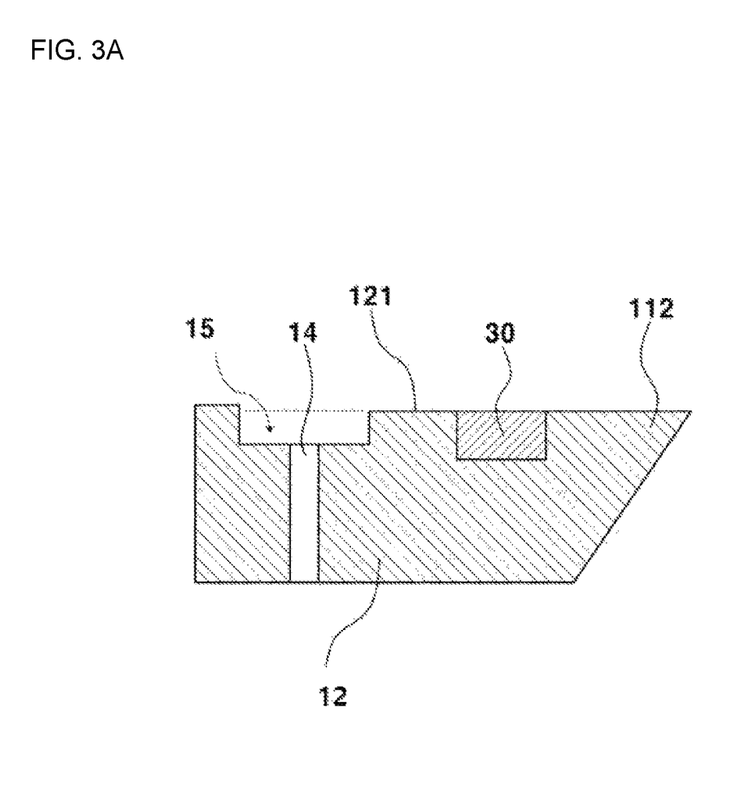
FIG. 3A is a diagram schematically showing a cross-sectional diagram of a second main body.
Figure 4:
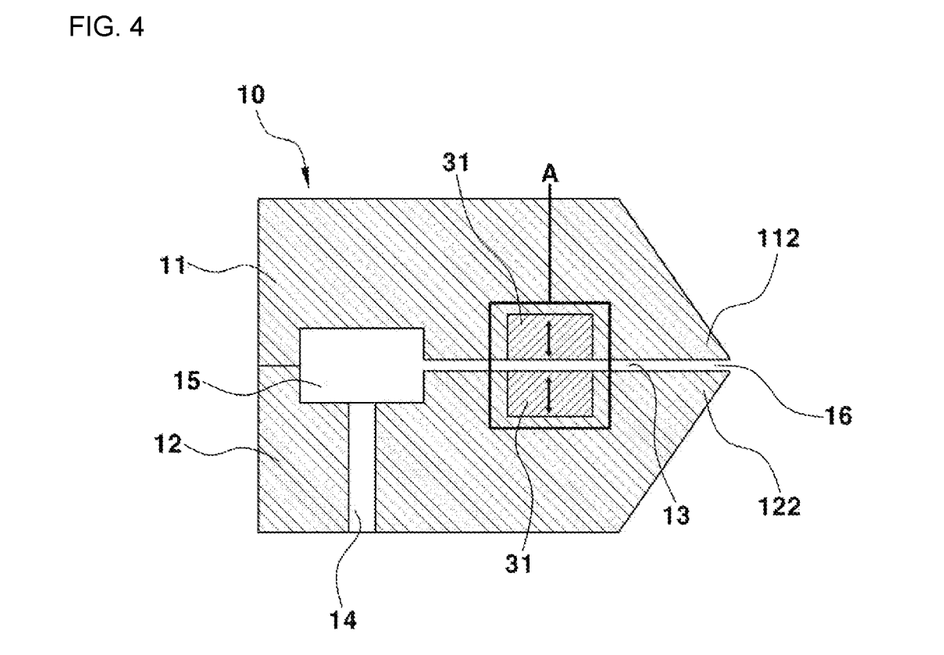
FIG. 4 is a diagram schematically showing a cross-sectional diagram of a main body unit on which a negative pressure generation unit according to a first embodiment is installed.

First, a slot die coating device according to a first embodiment of the present disclosure will be described with reference to FIGS. 1 to 4 as follows. Here, FIG. 1 is a schematic block diagram of a slot die coating device. FIG. 2A is a diagram schematically showing a cross-sectional diagram of a first side main body. FIG. 3 is a diagram schematically showing a cross-sectional diagram of a second side main body. FIG. 4 is a diagram schematically showing a cross-sectional diagram of a main body unit on which a negative pressure generation unit according to a first embodiment is installed.

Referring to FIGS. 1 to 4, a slot die coating device 100 according to a first embodiment of the present disclosure may include a main body unit 10, a coating agent supply unit 60, a negative pressure generation unit 30, and a power supply unit 50.

The main body unit 10 includes a first main body 11, a second main body 12, a head lip 13, a cavity 15, a discharge unit 16, and a supply flow path 14. The first main body 11 may include a first surface 111 and a first protrusion unit 112.

The first protrusion unit 112 may be formed to protrude by a certain length in a direction of the other end of the head lip 13. Here, the first protrusion unit 112 may be formed to protrude to be inclined in a direction of the first surface 111.

The second main body 12 may include a second surface 121 and a second protrusion unit 122. Here, the second surface 121 may be a surface corresponding to the first surface 111. The second main body 12 may be located to be spaced apart from the first surface 111 by a regular or uniform spacing.

The second protrusion unit 122 may be formed to protrude by a certain length in the direction of the other end of the head lip 13. Here, the second protrusion unit 122 may be formed to protrude to be inclined in a direction of the second surface 121.

Since the first protrusion unit 112 and the second protrusion unit 122 are formed in an inclined shape, the coating agent may be effectively discharged.

Specifically, the first main body 11 and the second main body 12 are plates having a right-angled trapezoidal shape in cross section, and may have a shape in which right-angled portions of the right-angled trapezoidal shape come into contact with each other at the top, and one sides of hypotenuse portions thereof are folded at the bottom.

The head lip 13 may refer to a space formed inside the main body unit 10 while the first main body 11 and the second main body 12 come into contact with each other, and specifically refers to a space between the first surface 111 and the second surface 121.

According to the present disclosure, the entire area of the space formed between the first surface 111 and the second surface 121 may be collectively referred to as a "head lip".

The cavity 15 may be a region in which the coating agent is stored, and may be formed to be recessed at a location spaced apart from the negative pressure generation unit 30 by a certain distance, and may be in communication with one end of the head lip 13.

The discharge unit 16 may be formed to discharge the coating agent to the outside through the head lip 13.

The discharge unit 16 may be formed between the first protrusion unit 112 and the second protrusion unit 122. The discharge unit 16 may communicate with the head lip 13.

Here, the coating agent stored in the cavity 15 may move to the discharge unit 16 through one end of the head lip 13 and may be discharged to the outside through the discharge unit 16.

The supply flow path 14 may be installed within the second main body 12, one end of which may be connected to the coating agent supply unit 60, and the other end of which may be connected to the cavity 15 to receive the coating agent from the coating agent supply unit 60 to transmit the coating agent to the cavity 15.

The coating agent supply unit 60 may be located outside the main body unit 10, and connected to the supply flow path 14 to supply the coating agent. The coating agent supply unit 60 may include a pump (not shown) and a tank (not shown). Here, the tank is a space in which the coating agent is stored. In addition, the pump may be electrically connected to the power supply unit 50 to generate a positive pressure through pumping to move the coating agent stored in the tank to the supply flow path 14. The pump may adjust the pressure in the head lip 13 through on/off.

The negative pressure generation unit 30 may be installed on at least one of the first main body 11 and the second main body 12 to generate a negative pressure in the head lip 13.

Figure 2B:
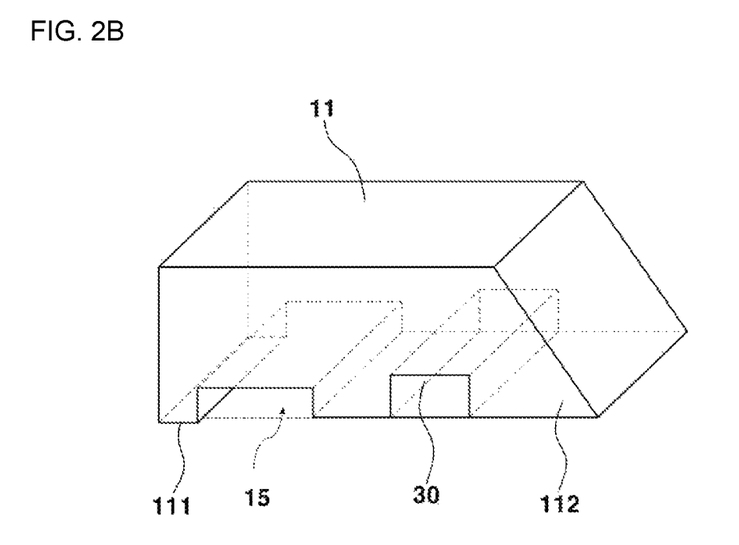
FIG. 2B is a diagram schematically showing a perspective diagram before negative pressure generation of FIG. 2A.
Figure 3B:
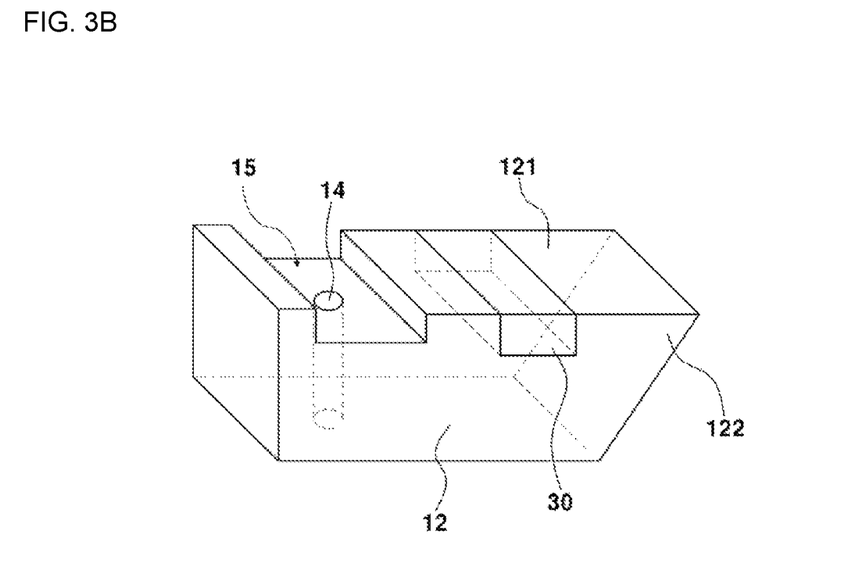
FIG. 3B is a diagram schematically showing a perspective diagram before negative pressure generation of FIG. 3A.

As shown in FIGS. 2B and 3B, the negative pressure generation unit 30 may be embedded in at least any one of the first surface 111 and the second surface 121. In addition, the negative pressure generation unit 30 may be located between the discharge unit 16 and the cavity 15. Here, FIG. 2B is a diagram schematically showing a perspective diagram before the negative pressure generation of FIG. 2A. In addition, FIG. 3B is a diagram schematically showing a perspective diagram before the negative pressure generation of FIG. 3A.

Since the negative pressure generation unit 30 may be located between the discharge unit 16 and the cavity 15, it is possible to effectively generate a negative pressure inside the main body unit 10.

The negative pressure generation unit 30 may include a piezoelectric element 31 that contracts or expands when a voltage is applied. The piezoelectric element 31 may have a certain thickness, and an outermost surface thereof may be embedded and installed to form the same plane as at least any one of the first surface 111 and the second surface 121. The piezoelectric element 31 may be installed so that its thickness may be vertically contracted.

Specifically, the piezoelectric element 31 may contain at least any one selected from the group consisting of Zinc oxide (ZnO), Barium Titanate (BaTiO$_3$), Lead zirconate titanate (PZT), Polyvinylidene fluoride (PVDF), Poly (vinylidene fluoride-trifluoroethylene (P(VDF-TrFE)), poly(vinylidene fluoride-trifluoroethylenechlorotrifluoroethylene) (P(VDF-TrFE-CTFE)), poly(vinylidene fluoride-trifluoroethylenechlorofluoroethylene)(P(VDF-TrFE-CFE)), poly(vinylidene fluoride-co-hexafluoropropylene)(P(VDF-HFP)), and combinations thereof.

Figure 2C:
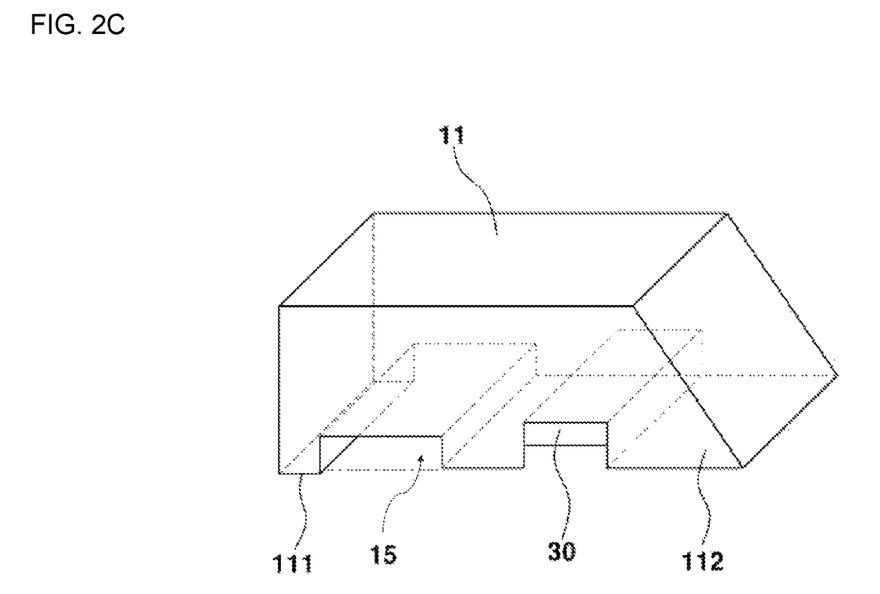
FIG. 2C is a diagram schematically showing a perspective diagram after the negative pressure generation of FIG. 2A.
Figure 3C:
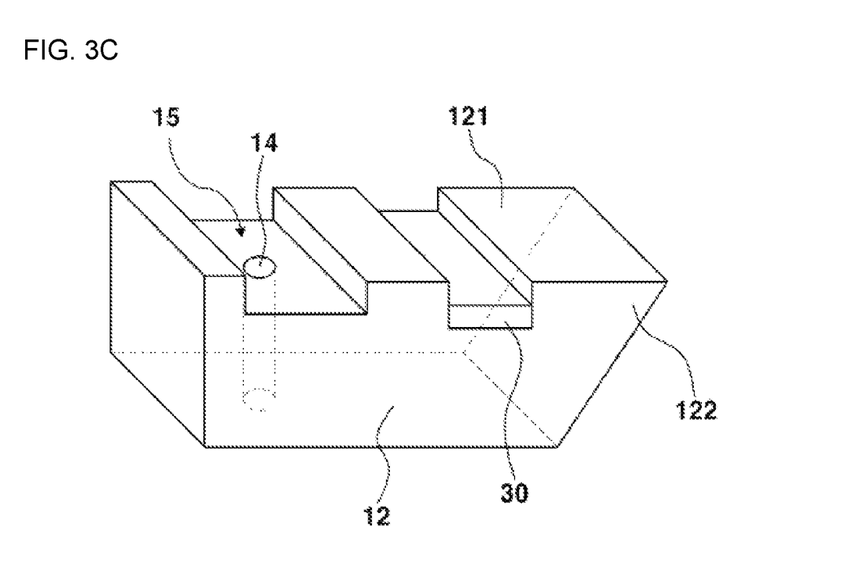
FIG. 3C is a diagram schematically showing a perspective diagram after the negative pressure generation of FIG. 3A.

As shown in FIGS. 2C and 3C, the negative pressure generation unit 30 may be contracted by voltage and thus reduced in thickness. Here, FIG. 2C is a diagram schematically showing a perspective diagram after the negative pressure generation of FIG. 2A. In addition, FIG. 3C is a diagram schematically showing a perspective diagram after the negative pressure generation of FIG. 3A.

Figure 5:
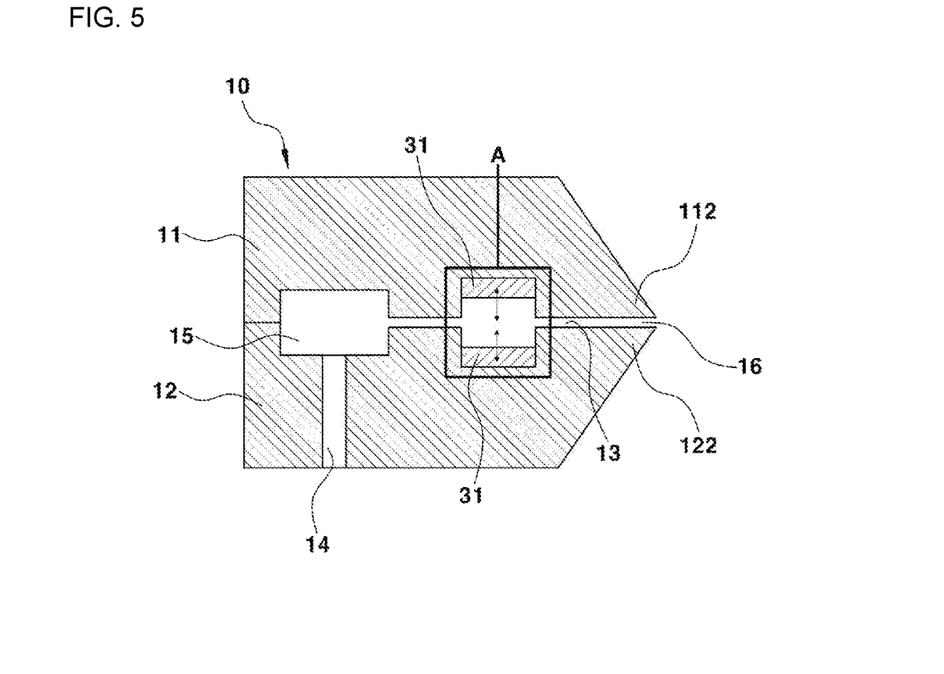
FIG. 5 shows a state in which the negative pressure generation unit according to the first embodiment is contracted.

In addition, referring to FIG. 5, the piezoelectric element 31 may expand the inner area of the head lip 13 through contraction. Here, FIG. 5 shows a state in which the negative pressure generation unit according to the first embodiment is contracted.

Accordingly, the volume of the head lip 13 may be increased through the contraction of the negative pressure generation unit 30, thereby reducing the pressure of the head lip 13.

Accordingly, the negative pressure generation unit 30 may expand the inner area of the head lip 13 through contraction to generate a negative pressure in the head lip 13.

Accordingly, the negative pressure generation unit 30 may generate the negative pressure in the head lip 13 to control the pressure within the main body unit 10, thereby minimizing the dragging to the surface of the substrate while coating, so that it is possible to neatly finish the boundary of the coating region.

Meanwhile, according to the present disclosure, as long as the piezoelectric element 31 has all shapes capable of expanding the inner area of the head lip 13 by contraction, there is no limitation on the location, size, thickness, and the like.

Figure 6:
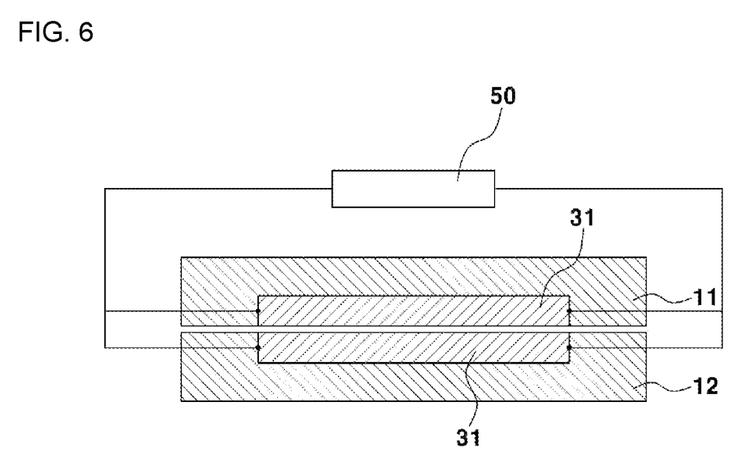
FIG. 6 shows a state in which the negative pressure generation unit according to a first embodiment is connected to a power supply unit.

Referring to FIG. 6, the power supply unit 50 may be electrically connected to the piezoelectric element 31 to supply a voltage to the piezoelectric element 31. Here, FIG. 6 is an enlarged diagram of region A in FIG. 4, and shows a state in which the negative pressure generation unit according to the first embodiment is connected to the power supply unit.

The power supply unit 50 may be any device capable of supplying power, but is not limited thereto.

Accordingly, the piezoelectric element 31 may precisely control a very small amount of pressure by appropriately setting the input voltage and the structure.

Second Embodiment

Figure 7:
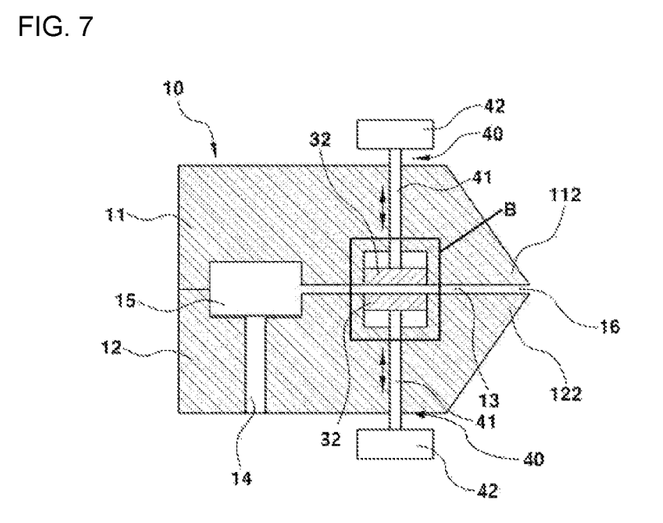
FIG. 7 is a diagram schematically showing a cross-sectional diagram of the main body unit on which a negative pressure generation unit according to a second embodiment is installed.

Next, a slot die coating device according to a second embodiment of the present disclosure will be described with reference to FIGS. 1 to 3 and FIG. 7 as follows. Here, FIG. 7 is a diagram schematically showing a cross-sectional diagram of the main body unit in which the negative pressure generation unit according to the second embodiment is installed.

The slot die coating device according to the second embodiment of the present disclosure may include the main body unit 10, the coating agent supply unit 60, the negative pressure generation unit 30, a driving unit 40, and the power supply unit 50.

For reference, the second embodiment is to implement the negative pressure generation unit 30 in different forms, and since the main body unit 10 and the coating agent supply unit 60 are the same as in the first embodiment, a description thereof will be omitted.

The negative pressure generation unit 30 may be embedded in at least any one of the first surface 111 and the second surface 121. The negative pressure generation unit 30 may be located between the discharge unit 16 and the cavity 15.

The negative pressure generation unit 30 may include a movable material 32 having a certain thickness and having an outermost surface installed to form the same plane as the first surface 111 or the second surface 121.

The movable material 32 may be installed to be vertically movable.

The movable material 32 is not limited by the material. Specifically, the movable material 32 may include at least any one selected from the group consisting of a metal, an inorganic material, an organic material, and combinations thereof.

The driving unit 40 may be connected to the movable material 32 to move the movable material 32 in an inner direction of the first surface 111 or the second surface 121.

The driving unit 40 may include a connecting member 41 and a driving member 42. Here, the connecting member 41 may be connected to the movable material 32, and installed to pass through at least any one of the first main body 11 and the second main body 12. In addition, the driving member 42 may be connected to the connecting member 41 to move the movable material 32.

The driving unit 40 may be located inside or outside the main body unit 10, and there is no limitation as long as it may move the movable material 32. For example, the connecting member 41 may be in the form of a driver, and the driving member 42 may be implemented in the form of a motor.

Figure 8:
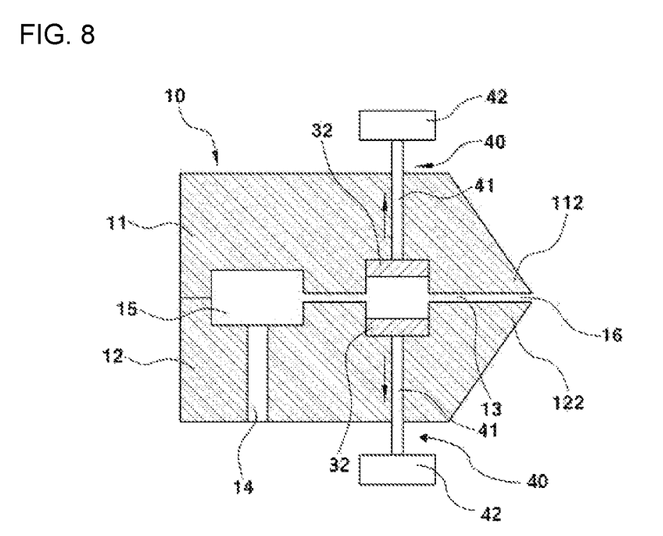
FIG. 8 shows a state in which the negative pressure generation unit according to the second embodiment is moved.

Referring to FIG. 8, the movable material 32 may expand the inner area of the head lip 13 through movement. Here, FIG. 8 shows a state in which the negative pressure generation unit according to the second embodiment is moved.

Accordingly, the movable material 32 may increase the volume of the head lip 13 through movement, thereby reducing the pressure of the head lip 13.

Accordingly, the negative pressure generation unit 30 may generate the negative pressure in the head lip 13 by expanding the inner area of the head lip 13 through movement.

Accordingly, the negative pressure generation unit 30 may expand the inner area of the head lip 13 to generate the negative pressure in the head lip 13 to control the pressure within the main body unit 10, thereby minimizing the dragging to the surface of the substrate while coating, so that it is possible to neatly finish the boundary of the coating region.

Figure 9:
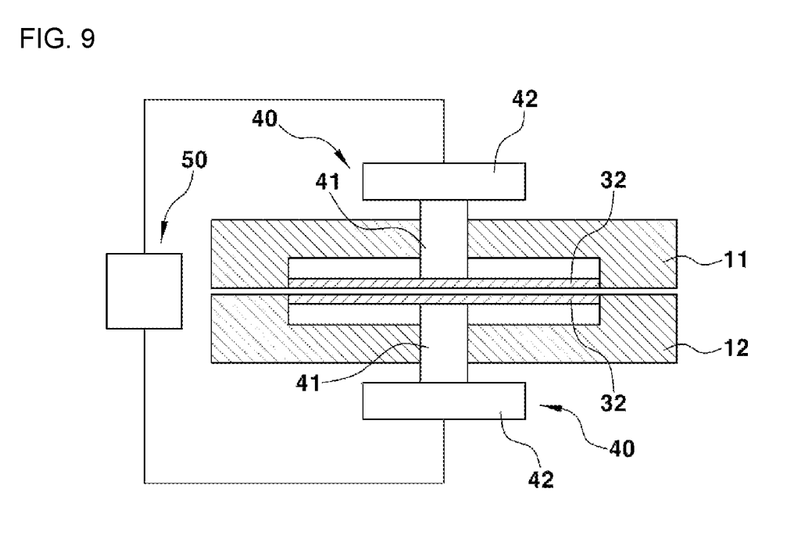
FIG. 9 shows a state in which the negative pressure generation unit according to the second embodiment is connected to the power supply unit.

Referring to FIG. 9, the power supply unit 50 may be electrically connected to the driving unit 40 to supply power. Here, FIG. 9 is an enlarged diagram of region B in FIG. 7, and shows a state in which the negative pressure generation unit according to the second embodiment is connected to the power supply unit.

The power supply unit 50 may be any device capable of supplying power, but is not limited thereto.

Figure 10:
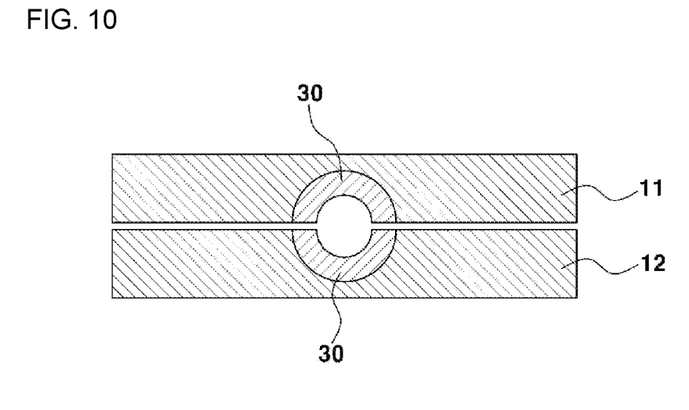
FIG. 10 schematically shows a negative pressure generation unit having a curved shape.

Meanwhile, in the embodiments 1 and 2, the shape of the negative pressure generation unit is limited to the rectangular parallelepiped shape, but the present disclosure is not limited thereto. As shown in FIG. 10, the negative pressure generation unit 30 may be implemented in a rounded curved shape on at least any one of the first main body 11 and the second main body 12. Here, FIG. 10 schematically shows a negative pressure generation unit having a curved shape.

In addition, in the embodiments 1 and 2, it has been described that one negative pressure generation unit is installed on at least any one of the first main body 11 and the second main body 12, but the present disclosure is not limited thereto, and a plurality of negative pressure generation units may be installed on at least any one of the first main body 11 and the second main body 12.

FIGS. 11 to 14 are enlarged diagrams of region A in FIG. 4, and schematically show a state in which the negative pressure generation unit is installed.

Figure 11:
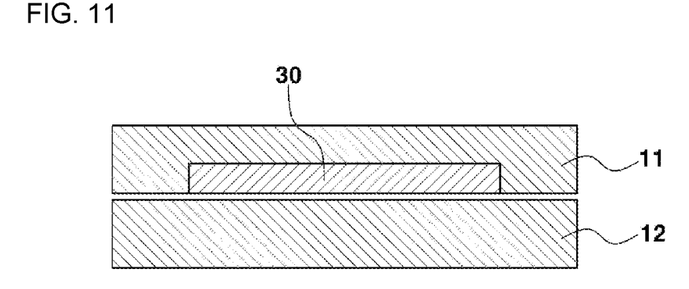
FIGS. 11 to 14 schematically show a state in which the negative pressure generation unit is installed.
Figure 12:
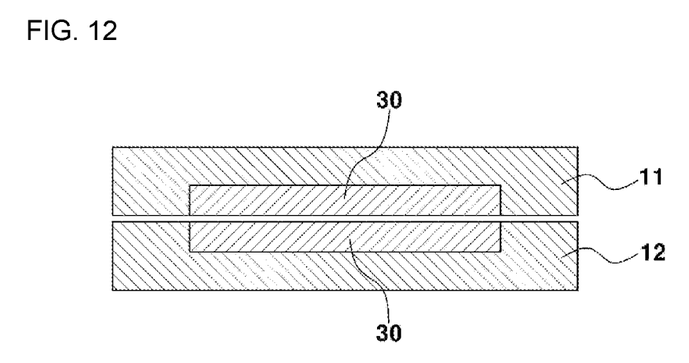

Referring to FIGS. 11 and 12, one negative pressure generation unit 30 may be installed on at least any one of the first main body 11 and the second main body 12.

Figure 13:
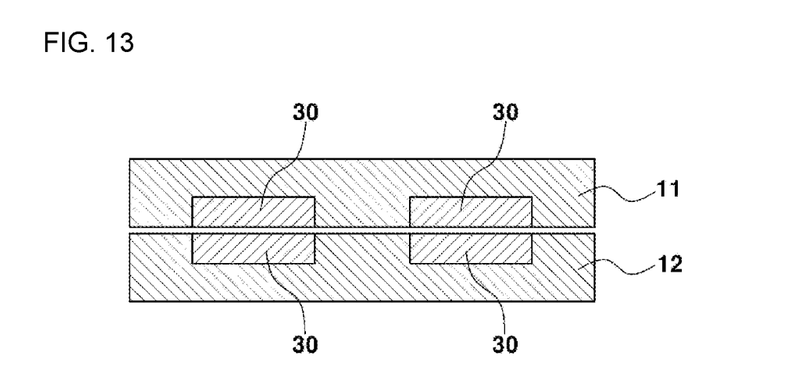

Referring to FIG. 13, a plurality of negative pressure generation units 30 may be installed on at least any one of the first main body 11 and the second main body 12.

Figure 14:
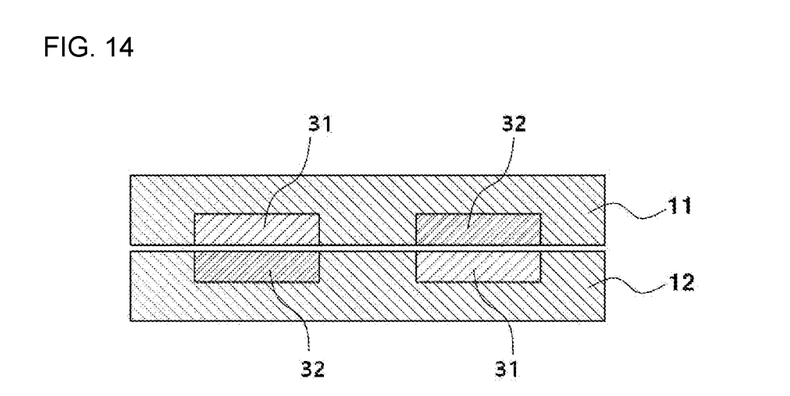

Referring to FIG. 14, the negative pressure generation unit 30 may be installed on at least one of the first body 11 and the second body 12 in mixed different forms.

For example, the negative pressure generation unit 30 may have the piezoelectric element 31 and the movable material 32 alternately arranged on at least any one of the first main body 11 and the second main body 12.

Specifically, the negative pressure generation unit may include the movable material 32 installed on the first main body 11, installed on the contracted piezoelectric element 31 when a voltage is applied and the second main body 12, and installed to be movable into the second surface by the driving unit.

A method of using the slot die coating device according to the present disclosure as described above includes an operation of supplying the coating agent to the slot die coating device and an operation of generating the negative pressure in the head lip by the negative pressure generation unit.

Each operation of the method of using the slot die coating device according to the present disclosure will be described in detail as follows.

Before describing each operation, the slot die coating device used in the method of using the slot die coating device may include the coating agent supply unit located outside the main body unit, and configured to supply the coating agent, the cavity formed to be recessed at the location spaced apart from the negative pressure generation unit by the certain distance, and being in communication with one end of the head lip, and having the coating agent stored therein, the first main body including the first protrusion unit formed to protrude by the certain length in the direction of the other end of the head lip, the second main body including a second protrusion unit formed to protrude by the certain length in the direction of the other end of the head lip, and the discharge unit formed between the first protrusion unit and the second protrusion unit.

First, the operation of supplying the coating agent may sequentially include an operation of supplying the coating agent to the cavity by the coating agent supply unit, an operation of filling the cavity with the coating agent, and an operation of discharging the filled coating agent by the discharge unit.

Here, the coating agent supply unit may include a pump and a tank. The pump adjusts the pressure in the head lip through on/off.

The coating agent supply unit may generate a positive pressure through pumping of the pump to move the coating agent stored in the tank to the cavity.

Next, the cavity may transmit the coating agent filled therein to the discharge unit by the generated positive pressure.

Subsequently, the discharge unit may discharge the coating agent to the outside by the positive pressure.

Finally, the operation of generating the negative pressure may expand the inner area of the head lip through contraction or movement to generate the negative pressure in the head lip by the negative pressure generation unit.

Here, when the negative pressure generation unit generates the negative pressure in the head lip through contraction, the negative pressure generation unit may include the piezoelectric element contracted when a voltage is applied.

At this time, the operation of generating the negative pressure is to apply a voltage to the piezoelectric element, and thus the piezoelectric element to which the voltage is applied can be contracted, thereby reducing the pressure of the head lip.

In addition, when the negative pressure generation unit generates the negative pressure in the head lip through movement, the negative pressure generation unit may include the movable material installed to be movable into the first surface or the second surface by the driving unit.

At this time, the operation of generating the negative pressure may be to move the movable material in an inner direction of the first surface or the second surface through the driving unit, and the movable material can move, thereby reducing the pressure of the head lip.

In addition, the method of using the slot die coating device according to the present disclosure may alternately perform the operation of supplying the coating agent and the operation of generating the negative pressure.

The time point when the negative pressure generation unit generates the negative pressure may be adjusted by selecting before and after the time when the pump is turned on/off.

Accordingly, according to the present disclosure, it is possible to precisely control the flow rate of the coating agent through the pump and the negative pressure generation unit. In addition, it is possible to expand the area of the head lip and generate the negative pressure in the head lip to induce the coating agent to be cut off quickly and easily.

Accordingly, according to the present disclosure, it is possible to precisely control the discharge of the coating agent by directly controlling the pressure inside the main body unit.

While the embodiments of the present disclosure have been described above, those skilled in the art to which the present disclosure pertains will be able to understand that the present disclosure may be carried out in other specific forms without changing its technical spirit or essential features. Accordingly, it should be understood that the above-described embodiments are illustrative and not limiting in all respects.

What is claimed is:

1. A slot die coating device comprising:
   a first main body comprising a first surface;
   a second main body comprising a second surface and located to be spaced apart from the first surface;
   a head lip that is positioned between the first surface and the second surface; and
   a negative pressure generation unit installed on at least any one of the first main body and the second main body, and configured to generate a negative pressure in the head lip,
   wherein the first main body further comprises a first protrusion unit extended a certain length from the first surface; and
   the second main body further comprises a second protrusion unit extended a certain length in the same direction as the first protrusion from the second surface,
   further comprising:
   (a) a cavity formed to be recessed at a location spaced apart from the negative pressure generation unit, and in communication with the head lip, and having a coating agent therein; and
   (b) a discharge unit formed between the first protrusion unit and the second protrusion unit, the discharge unit is in communication with the head lip,
   wherein the negative pressure generation unit is directly in communication with the head lip,
   wherein the negative pressure generation unit is embedded in the first surface and the second surface of the head lip.

2. The slot die coating device of claim 1,
   wherein the first protrusion unit is formed to protrude to be inclined in a first surface direction, and
   the second protrusion unit is formed to protrude to be inclined in a second surface direction.

3. The slot die coating device of claim 1, further comprising:
   a coating agent supply unit located outside the main body unit, and configured to supply the coating agent; and
   a supply flow path installed within the second main body, having one end connected to the coating agent supply unit, and the other end connected to the cavity to receive the coating agent from the coating agent supply unit to transmit the coating agent to the cavity.

4. The slot die coating device of claim 1,
   wherein the negative pressure generation unit comprises a piezoelectric element contracted when a voltage is applied, and
   the slot die coating device further comprises a power supply unit electrically connected to the piezoelectric element to supply a voltage to the piezoelectric element.

5. The slot die coating device of claim 4,
   wherein the piezoelectric element is contracted when the voltage is applied and reduced in thickness.

6. The slot die coating device of claim 4,
   wherein the piezoelectric element comprises: at least any one of Zinc oxide (ZnO), Barium Titanate (BaTiO$_3$), Lead zirconate titanate (PZT), Polyvinylidene fluoride (PVDF), Poly(vinylidene fluoride-trifluoroethylene (P(VDF-TrFE)), poly(vinylidene fluoride-trifluoroethylenechlorotrifluoroethylene)) (P(VDF-TrFE-CTFE)), poly(vinylidene fluoride-trifluoroethylenechlorofluoroethylene) (P(VDF-TrFE-CFE)), poly(vinylidene fluoride-co-hexafluoropropylene) (P(VDF-HFP)) or any combination thereof.

7. The slot die coating device of claim 1,
   wherein the negative pressure generation unit comprises a movable material having a certain thickness, and having an outermost surface installed to form the same plane as the first surface or the second surface, and
   the slot die coating device further comprises:
   a driving unit connected to the movable material to move the movable material in an inner direction of the first surface or the second surface; and
   a power supply unit electrically connected to the driving unit to supply power.

8. The slot die coating device of claim 7,
   wherein the movable material comprises: at least one of a metal, an inorganic material, an organic material or any combination thereof.

9. The slot die coating device of claim 1,
   wherein the negative pressure generation device expands an inner area of the head lip through contraction or movement.

10. The slot die coating device of claim 1,
    wherein the negative pressure generation unit increases the volume of the head lip through contraction or movement to reduce the pressure of the head lip.

11. The slot die coating device of claim 1,
    wherein a plurality of negative pressure generation units are installed on the first main body or the second main body.

12. The slot die coating device of claim 1,
    wherein the negative pressure generation unit comprises:
    a piezoelectric element installed on the first main body and contracted when a voltage is applied; and
    a movable material installed on the second main body and installed to be movable into the second surface by a driving unit.

13. The slot die coating device of claim 1,
    wherein the first surface and the second surface are uniformly spaced apart.

14. A method of using the slot die coating device of claim 1, the method comprising:
    supplying a coating agent to the slot die coating device; and
    generating a negative pressure in the head lip by the negative pressure generation unit.

15. The method of claim 14,
    wherein the negative pressure generation unit comprises a piezoelectric element contracted when the voltage is applied,
    the operation of generating the negative pressure applies the voltage to the piezoelectric element, and
    the piezoelectric element to which the voltage is applied is contracted to reduce the pressure of the head lip.

16. The method of claim 14,
    wherein the negative pressure generation unit comprises a movable material installed to be movable into the first surface or the second surface by a driving unit, and the operation of generating the negative pressure moves the movable material in the inner direction of the first surface or the second surface through the driving unit, and the movable material moves to reduce the pressure of the head lip.

17. The method of claim 14,
wherein the operation of supplying the coating agent and the operation of generating the negative pressure are alternately performed.

* * * * *